2,994,606
METHOD OF MANUFACTURING SINTERED BEARINGS
Carl L. Goodzeit, Birmingham, Mich., assignor to General Motors Corporation, Detroit, Mich., a corporation of Delaware
No Drawing. Filed Dec. 3, 1958, Ser. No. 777,857
14 Claims. (Cl. 75—214)

This invention relates to sintered aluminum and aluminum alloy products and more particularly to sintered aluminum and aluminum alloy bearings and to a new and improved method of making the same.

Aluminum and aluminum alloys have been used in increased amounts in recent years in the manufacture of bearings. Good bearing metals, such as lead, cadmium and indium, are frequently too malleable to be used alone as bearing materials and must, accordingly, be used in connection with another less malleable metal.

Aluminum base mixtures containing a suitable bearing metal have found widespread use as a bearing material. Such materials are conventionally formed by dissolving the bearing metal in molten aluminum and subsequently cooling the resultant alloy wherein the constituents separate into a two-phase, aluminum-bearing metal mixture. The aluminum or aluminum alloy provides the strength characteristics while the separate phase of the bearing metal provides the necessary resistance to seizure of the bearing with the journal.

The conventional processes of forming the two-phase alloy is limited, however, in that it is necessary that the bearing metal have some limited solubility in the phase of supporting metal. Aluminum alloys containing lead, for example, would provide a satisfactory bearing metal, but due to the virtual insolubility of lead in molten aluminum, aluminum alloys containing large amounts of lead cannot be prepared by conventional methods.

Principal objects of this invention are to provide an improved sintered bearing and to provide a new method of making sintered aluminum and aluminum alloy bearings.

Other objects, features and advantages of the invention will become more apparent from the following description of specific embodiments thereof.

In accordance with the invention, powdered aluminum or a powdered aluminum alloy is uniformly mixed with a powdered lead halide and the resulting mixture subsequently heated at a suitable sintering temperature. The heating at the sintering temperature is continued for a sufficient duration to firmly bond the aluminum or aluminum alloy particles together and simultaneously convert the lead in the halide salt to a metallic lead coating on the individual particles of the sintered aluminum.

In forming a sintered bearing in accordance with my invention, I believe that the lead halide reacts with aluminum and aluminum oxide to form aluminum halide and aluminum oxy-halides which are relatively volatile and which are gaseous at the sintering temperatures employed. In the reaction free lead is simultaneously deposited on the surface of each particle of aluminum. Similarly, I believe that the aluminum oxide coating on the particles of the aluminum or aluminum alloy reacts with the lead halide to also form similar relatively volatile aluminum compounds.

The method in which the powdered aluminum or aluminum alloy is mixed with the lead halide salt is not material to the invention, provided that a uniform mixture is formed. Generally any form of mixing can be used, such as hand mixing in a mortar or any of the known and accepted mechanical methods of uniformly mixing powdered materials. Of course, should the powdered lead halide salt contain large lumps, such as might be formed during storage, the lumps should be broken up either prior to or during the mixing operation.

Conventional sintered bearings are generally formed of a briquetted material which is stronger and more resistant to deformation under high load conditions. I have found that a highly satisfactory sintered bearing can be formed in accordance with my invention when the powdered materials are briquetted under a pressure of at least about 10 tons per square inch. The maximum satisfactory amount of compression pressure which can be used is variable and I have found that very good sintered bearings can be formed with briquetting pressures of as high as 60 tons per square inch. Although in some instances it may be preferred to employ higher briquetting pressures, the mixture should not be briquetted at a pressure which will inhibit satisfactory diffusion of the volatile aluminum compounds from the briquette. Accordingly, the mixture can be briquetted under any pressure above about 10 tons per square inch which will provide the necessary density but which will permit a satisfactory rate of diffusion of the volatile reaction products out of the briquette during sintering.

The temperature at which the mixture is preferably sintered is as variable as is the temperature in a conventional sintering operation. I have found that highly satisfactory results are obtained when the mixture is sintered between a temperature of approximately 300° C. and 640° C. The optimum sintering temperature which is to be used, of course, will vary somewhat depending upon the particular composition of the mixture, the briquetting pressure, the characteristics desired in the finished products, etc. In most instances, the mixture can be sintered at any temperature which would be ordinarily suitable for sintering the particular aluminum or aluminum base alloys which are employed.

The minimum duration of the heating during sintering is somewhat variable and depends primarily upon the rate at which the volatile products formed during sintering diffuse out of the mixture. Lightly compacted or uncompacted mixtures can be satisfactorily sintered in about one hour. On the other hand, mixtures which have been briquetted under pressures of 60 tons per square inch may require as long as 24 hours to allow substantially all the reaction products to diffuse out of the briquette. Additionally, the thickness of the part will function in determining the minimum sintering time to employ, thicker parts having to be sintered longer.

In the sintering operation I believe that the lead halide is very quickly converted almost completely to free lead. The sintering should be continued, however, to permit diffusion of substantially all of the halide salts out of the mixture. If quantities of halide salts in excess of about 0.2%, by weight of the total mixture, remain in the mixture after sintering, the product formed will be undesirably brittle and subject to corrosion. Thus, by saying that substantially all of the halide salts must be diffused out of the mixture, I mean that no more than about 0.2%, by weight of the total mixture, remain.

Under certain conditions, it may be desirable to sinter the material in an atmosphere which will inhibit corrosion or oxidation of the mixture at the elevated sintering temperatures. Heating in an atmosphere of cracked ammonia (one part, by volume, nitrogen and three parts, by volume, hydrogen) is generally satisfactory for this purpose. Other non-oxidizing atmospheres which can be employed are natural gas, nitrogen, hydrogen, carbon monoxide, argon, helium or the like. In some instances, however, the mixture can be sintered in an oxidizing atmosphere, such as air, without detrimental effect due to the presence in the mixture of the gaseous reaction products formed.

As a specific example of my invention, I have mixed approximately 75%, by weight, powdered aluminum of about a 325 mesh size with about 25%, by weight, plumbous chloride in a mortar to form a uniform mixture. The mixture was introduced into a briquetting die and then briquetted at a pressure of approximately 60 tons per square inch to form a briquette approximately one inch in length and about 3/8 x 1/4 square inch in a rectangular cross-sectional area.

This briquette was then sintered at 600° C. for approximately 17 hours in an Argon atmosphere. The sintered briquette was then cooled in the Argon atmosphere at room temperature. The resultant alloy which was obtained was malleable and ductile. The resultant alloy had a composition of approximately 18.7% by weight, lead and the balance aluminum.

For general purpose bearings, aluminum or aluminum alloys are preferably used in the mixture in amounts of approximately 70% to 90%, by weight. However, in instances where extremely small particles of metal are used, it may be preferred to employ a powdered metal in amounts of only about 50%, whereas in forming mixtures with relatively large sized particles of aluminum or aluminum alloys, it may be preferred to use as high as about 95% aluminum.

I have found that powdered aluminum or aluminum alloys having a particle size which will pass about a 325 mesh screen can be satisfactorily employed in the practice of my invention. In referring to aluminum alloys, I intend to encompass alloys containing at least about 75%, by weight, aluminum.

Highly satisfactory bearings are formed in accordance with the invention when approximately 10% to 30%, by weight, of the powdered lead halide is used with the aluminum or aluminum base alloy. In some instances, however, it may be preferred to employ the lead halide in amounts, by weight, as high as about 50% or as low as about 5%. The particular composition which is preferred, of course, will depend upon the characteristics desired in the finished product. As a general rule, however, larger proportions of the halide can be used more satisfactorily with metal particles which are of a relatively small, average particle size.

The halides which can be used in my invention are preferably the chloride and bromide salts of divalent lead. Plumbous chloride and plumbous bromide can be used as the commercially obtained powder.

Although my invention is primarily intended to provide a new and improved sintered bearing which is composed of aluminum and lead, I have also found that sintered compositions of aluminum or aluminum base alloys containing indium and cadmium can also be similarly formed. Mixing cadmium chloride, cadmium bromide, indium chloride or indium bromide in the proportions hereinbefore described and sintering at a suitable temperature will also deposit cadmium and indium on the aluminum particles. Sintered aluminum or aluminum alloys of compositions containing thallium, copper, silver and tin can also be satisfactorily formed in this manner using the suitable chloride and bromide salts.

Although I have discussed my invention with respect to the use of a halide salt of a single metal, it is also contemplated that mixtures of halides, such as plumbous chloride and indium chloride, can also be used simultaneously to deposit two or more metals.

Powdered aluminum or aluminum alloys are usually quite difficult to sinter by conventional processes. The metal particles are coated with a protective aluminum oxide film which inhibits formation of satisfactory metal-to-metal bonds and therefore inhibits successful sintering. For some applications small amounts of any powdered chloride or bromide salt of a metal below aluminum in the electromotive series will be satisfactory in providing a fluxing action in the sintering of the powdered aluminum or aluminum alloy. Satisfactory sintering of these powdered metals is enhanced when the chloride or bromide salt is used in even small but effective amounts.

Although this invention has been described in connection with certain specific examples thereof, no limitation is intended thereby except as defined in the appended claims.

I claim:

1. A method of making a bearing which comprises introducing a mixture including at least one powdered metal selected from the group consisting of aluminum and aluminum base alloys and plumbous bromide into a briquetting die, compressing said mixture in said die to form a briquette and sintering said briquette at a suitable temperature.

2. A method of making a bearing which comprises forming a mixture containing, by weight, approximately 50% to 95% of powdered metal selected from the group consisting of aluminum and aluminum base alloys and 5% to 50% plumbous bromide and sintering said mixture at a suitable temperature below the melting point of said powdered metal for a sufficient duration to permit substantially all of the reaction products between said halide and said metal to diffuse out of said mixture.

3. A method of making a bearing which comprises placing in a compacting means a mixture containing, by weight, about 50% to 95% of a powdered metal selected from the group consisting of aluminum and aluminum base alloys and 5% to 50% plumbous bromide, said powdered metal having a particle size which will pass approximately a 325 mesh screen, compressing the mixture in said compacting means under a pressure of at least about 10 tons per square inch to form a briquette, and sintering said briquette at a suitable temperature below approximately the melting point of said metal for a sufficient duration to permit substantially all of the reaction products between said halide and said metal to diffuse out of said briquette.

4. A method of making a bearing which comprises forming a uniform mixture containing, by weight, about 50% to 95% of a powdered metal selected from the group consisting of aluminum and aluminum base alloys and 5% to 50% of a lead halide, said powdered metal having a particle size which will pass approximately a 325 mesh screen, introducing said mixture into a briquetting die, compressing the mixture in said die under a pressure of about 10 tons per square inch to 60 tons per square inch to form a briquette, and sintering said briquette at a suitable temperature between about 300° C. and 640° C. for a sufficient duration to permit substantially all of the reaction products between said halide and said metal to diffuse out of said briquette.

5. A method of making a bearing which comprises introducing into a compacting means a mixture containing, by weight, approximately 70% to 90% of a powdered metal selected from the group consisting of aluminum and aluminum base alloys and 10% to 30% plumbous bromide, compressing said mixture under a pressure of at least 10 tons per square inch to form a briquette and sintering said briquette at a suitable temperature below the melting point of said powdered metal for a sufficient duration to permit substantially all of the reaction products between said halide and said metal to diffuse out of said briquette.

6. A method of making a bearing which comprises forming a uniform mixture containing, by weight, about 70% to 90% of a powdered metal selected from the group consisting of aluminum and aluminum base alloys and 10% to 30% of a lead halide, said powdered metal having a particle size which will pass approximately a 325 mesh screen, introducing said mixture into a briquetting die, compressing the mixture in said die under a pressure of about 10 tons per square inch to 60 tons per square inch to form a briquette, and sintering said briquette at a suitable temperature between about 300° C. and 640° C. for a sufficient duration to permit substantially all of the reaction products between said halide and said metal to diffuse out of said briquette.

7. A method of making a bearing which comprises briquetting a mixture including at least one powdered metal selected from the group consisting of aluminum and aluminum base alloys and a powered halide selected from the group of halides consisting of plumbous chloride, plumbous bromide, indium chloride, indium bromide, cadmium chloride and cadmium bromide, and sintering said briquetted mixture at a suitable temperature below the melting point of said powdered metal for a sufficient duration to permit substantially all the reaction products between said halide and said metal to diffuse out of said briquette.

8. A method of making a bearing which comprises forming a mixture containing, by weight, approximately 50% to 95% of a powdered metal selected from the group consisting of aluminum and aluminum base alloys and 5% to 50% of a powdered halide selected from the group of halides consisting of plumbous chloride, plumbous bromide, indium chloride, indium bromide, cadmium chloride and cadmium bromide, and sintering said mixture at a suitable temperature between about 300° C. and 640° C. for a sufficient duration to permit substantially all the reaction products betwen said halide and said metal to diffuse out of said mixture.

9. A method of making a bearing which comprises forming a mixture containing, by weight, 50% to 95% of a powdered metal selected from the group consisting of aluminum and aluminum base alloys and 5% to 50% of a powdered halide selected from the group of halides consisting of plumbous chloride, plumbous bromide, indium chloride, indium bromide, cadmium chloride and cadmium bromide, said powdered metal having a particle size which will pass approximately a 325 mesh screen, introducing said mixture into a briquetting die, compressing the mixture in said die under a pressure of at least about 10 tons per square inch to form a briquette, and sintering said briquette at a suitable temperature below the melting point of said metal for a sufficient duration to permit substantially all of the reaction products between said halide and said metal to diffuse out of said briquette.

10. A method of making a bearing which comprises introducing in a compacting means a uniform mixture containing, by weight, about 70% to 90% of a powdered metal selected from the group consisting of aluminum and aluminum base alloys and about 10% to 30% of a powdered halide selected from the group of halides consisting of plumbous chloride, plumbous bromide, indium chloride, indium bromide, cadmium chloride and cadmium bromide, said powdered metal having a particle size which will pass approximately a 325 mesh screen, introducing said mixture into a briquetting die, compressing the mixture in said die under a pressure of about 10 tons per square inch to 60 tons per square inch to form a briquette, and sintering said briquette at a suitable temperature between approximately 300° C. and 640° C. for a sufficient duration in a non-oxidizing atmosphere to permit substantially all of the reaction products between said halide and said metal to diffuse out of said briquette.

11. A method of making a bearing which comprises introducing a mixture including at least one powdered metal selected from the group consisting of aluminum and aluminum base alloys and plumbous chloride into a briquetting die, compressing said mixture in said die to form a briquette and sintering said briquette at a suitable temperature.

12. A method of making a bearing which comprises forming a mixture containing, by weight, approximately 50% to 95% of a powdered metal selected from the group consisting of aluminum and aluminum base alloys and 5% to 50% plumbous chloride and sintering said mixture at a suitable temperature below the melting point of said powdered metal for a sufficient duration to permit substantially all of the reaction products between said halide and said metal to diffuse out of said mixture.

13. A method of making a bearing which comprises placing in a compact means a mixture containing, by weight, about 50% to 95% of a powdered metal selected from the group consisting of aluminum and aluminum base alloys and 5% to 50% plumbous chloride, said powdered metal having a particle size which will pass approximately a 325 mesh screen, compressing the mixture in said compacting means under a pressure of at least about 10 tons per square inch to form a briquette, and sintering said briquette at a suitable temperature below approximately the melting point of said metal for a sufficient duration to permit substantially all of the reaction products between said halide and said metal to diffuse out of said briquette.

14. A method of making a bearing which comprises introducing into a compacting means a mixture containing, by weight, approximately 70% to 90% of a powdered metal selected from the group consisting of aluminum and aluminum base alloys and 10% to 30% plumbous chloride, compressing said mixture under a pressure of at least 10 tons per square inch to form a briquette and sintering said briquette at a suitable temperature below the melting point of said powdered metal for a sufficient duration to permit substantially all of the reaction products between said halide and said metal to diffuse out of said briquette.

References Cited in the file of this patent

UNITED STATES PATENTS 2,327,805    Koehring    Aug. 24, 1943

OTHER REFERENCES

Goetzel: Treatise on Powder Metallurgy, vol. 2 (1950), pp. 731, 732.